United States Patent Office 3,235,723
Patented Feb. 15, 1966

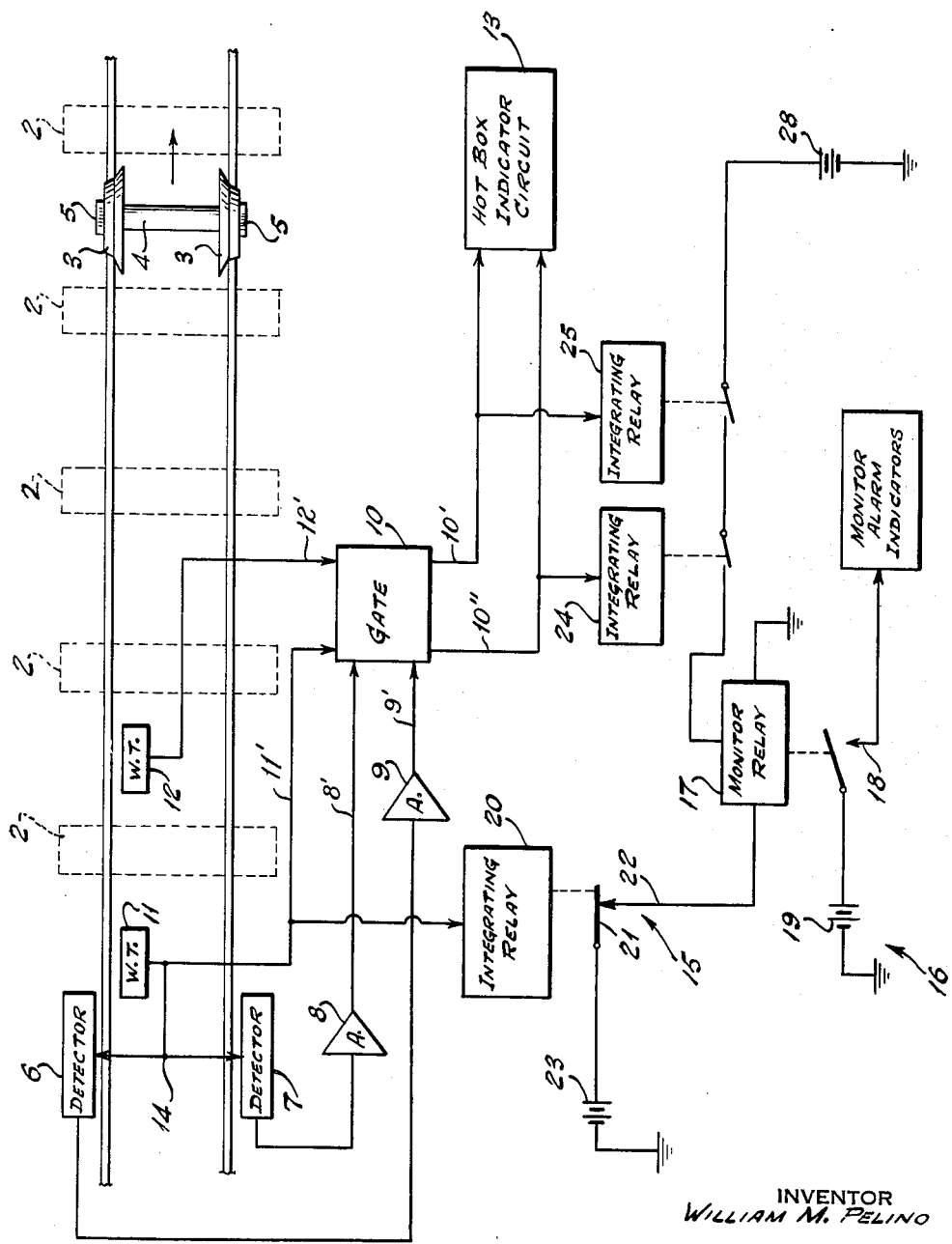

3,235,723
HOT-BOX DETECTOR ALARM CIRCUIT
William M. Pelino, Garden City, N.Y., assignor to Servo Corporation of America, Hicksville, N.Y., a corporation of New York
Continuation of application Ser. No. 758,200, Sept. 2, 1958. This application July 26, 1962, Ser. No. 216,267
10 Claims. (Cl. 246—169)

This invention relates to trackside-mounted hot-box detector circuits for detecting overheated journal bearings on moving railroad stock, and more particularly to a circuit for monitoring the operability of the hot-box detector circuit. This application is a continuation of Serial No. 758,200, filed on September 2, 1958 entitled Hot-Box Detector Alarm System.

Hot-box detectors are now known for detecting heat conditions of journal bearings on moving rolling stock. For typical hot-box detector circuits, of the type to which this invention relates, reference may be made to co-pending applications, Serial No. 747,553, filed June 30, 1958, for Hot-Box Detector, now Patent No. 2,880,309, issued March 31, 1959; Serial No. 670,220, filed July 5, 1957, for Railroad Wheel Trip, now abandoned but being a parent application resulting in Patent 3,151,827, issued October 4, 1964; and Serial No. 695,352, filed November 8, 1957, for Automatic Alarm Circuit for Hot-Box Detector, now abandoned but being the parent application resulting in Patent 2,963,575, issued December 6, 1960.

Generally hot-box detector circuits comprise means for detecting heat conditions of journal bearings on moving rolling stock and producing signals corresponding to such heat conditions. The means for detecting the heat conditions is preferably a bolometer, which comprises a plurality of infra-red devices connected in a balanced bridge circuit. The bridge circuit produces a signal in response to the detection by one of the infra-red devices of journal heat representing a temperature higher than ambient temperature. The heat signal developed by the bolometer is amplified and applied to recording or signal displaying equipment. An overheated journal bearing, of course, is represented by a signal many times the amplitude of a signal representing a journal bearing at the normal operating temperature.

The recording equipment is usually under the surveillance of a technician, and when a hot-box condition is detected, he communicates with the train engineer and advises him of the dangerous journal condition. By counting the number of pulses produced by the bolometer which correspond to the number of journals having passed the detector, the technician is able to locate precisely the over-heated journal bearing. The value of being able to locate precisely the over-heated journal bearing is at once apparent when it is realized that freight-trains often consist of over one hundred cars.

When the heat detecting and recording equipment are located at an attended station, the operability of the heat detecting equipment is ascertained by the technician simply observing the recorded pulses, or signals, corresponding to the heat generated by each of the journal boxes. However, most installations fall into the category of unattended stations. In the unattended stations only those heat signals representing dangerous hot-box conditions are transmitted to the remote attended station, whereupon the technician may advise the train engineer of a dangerous journal condition. The normal heat signals, although recorded, are not transmitted to the remote attended station. The unattended station introduces a problem, not present in the attended station, of determining the inoperability of defective heat detector equipment. This problem arises because only signals corresponding to hot-box conditions are transmitted to the attended station. Thus, if a hot-box detector is defective, and in fact is not producing any signals, the equipment at the attended station has no way of ascertaining whether the heat detecting equipment at the unattended station is faulty or whether there are no hot-box conditions on the moving stock.

Accordingly, it is a primary object of this invention to provide automatic testing or checking equipment for monitoring the operability of the heat detecting equipment in a hot-box detecting system.

It is a further object of this invention to provide a monitoring circuit operable in response to signals produced by the heat detecting equipment, whereby a faulty condition is ascertained by the absence of such signals.

It is still a further object of this invention to provide a monitoring circuit which is responsive to the train location and also to the signals developed by the heat detecting equipment, so that faulty heat detecting equipment is recognized immediately upon the rolling stock moving through a predetermined section of track.

In accordance with an aspect of the invention, there is provided a circuit for detecting heat conditions of bearings on moving railroad stock, comprising a trackside-mounted heat detector for producing signals in response to the heat conditions of the bearings and means for applying the signals to a signal indicator, whereby relative amplitudes of the signals may be compared for hot-box determination. The invention is characterized by providing in combination with the heat detecting circuit a testing or checking monitoring circuit, which is rendered operatve in response to the signals produced by the heat detecting circuit. In the absence of such signals, the monitoring circuit produces an alarm for indicating the faulty condition of the heat detecting equipment.

In accordance with a more limited aspect of the invention, wheel-trip devices are mounted alongside the track, which are adapted to produce electrical signals in response to rolling stock passing over the devices. These electrical signals are applied to, and prepare, the monitoring circuit for the reception of signals from the heat detector. The heat detector is positioned so as to detect the heat conditions of the bearings as the rolling stock passes through the section of track between these devices. Thus, if the heat detector is faulty, it will not generate signals, and during the period that the rolling stock is moving through the section of track between the wheel-trip devices, the absence of signals will be detected by the monitoring circuit.

The above mentioned and other features and objects of this invention and the manner of attaining them will become apparent and the invention itself will be best understood by reference to the following description of an embodiment of the invention taken in conjunction with the accompanying drawing, showing by block diagram the novel heat detecting and monitoring circuits.

Referring to the drawing, there is illustrated a section of railroad track positioned and secured to railroad ties 2. Rolling stock, as suggested by wheels 3 and axle 4, rides on the tracks. Journal bearing housings located at opposite ends of the axle 4 are shown at 5.

The heat radiation or temperature of the journal boxes 5 relative to ambient radiation is determined by a circuit comprising hot-box detectors 6, 7, respectively mounted at opposite sides of the track. Suitable infra-red detectors and mounting positions for the detectors are described in the above mentioned Patent No. 2,880,309. Since this invention is not directed to the construction or location of the detectors 6, 7, the detectors are shown by block diagram mounted alongside the track. The detectors are positioned to detect the heat radiations from the journal boxes on opposite sides of the axle. Each of the detectors produces a signal which corresponds to the temperature of the journal bearings relative to ambient temperature. The signals produced by the detectors 6, 7 are amplified at 8, 9, respectively, and applied to a normally closed gate circuit 10.

The purpose of the gate circuit 10 is to pass the "heat" signals only when the journal boxes are in the field of detection of the detectors. In others words, the gate circuit 10 serves to prevent the passing of signals which may correspond to heat conditions observed by the detectors prior, or subsequent, to the detection of the journal boxes. In the absence of a protective circuit, such as the gate 10, the hot-box detector which comprises optics for focusing an image of a heat sensitive cell on the journal box may easily transmit an electrical signal reflecting the image of an unwanted background.

The gate circuit 10 is controlled by wheel-trip devices 11, 12, which are spaced apart a known distance related to the viewing axis of the detectors. Suitable wheel-trip devices are described in the above mentioned application Serial No. 670,220. The devices 11, 12 should be spaced so that the desired area of the journal box may be completely traversed by the viewing axis of the detector. One of the wheel-trip devices produces a signal to open the gate 10 and the other wheel-trip device produces a signal to close the gate 10. For a train moving in the direction of the arrow, a wheel passing over wheel-trip device 11 results in opening the gate 10. While the gate is open, the signals produced by the detectors 6, 7 and amplified at 8 and 9, respectively, are, in effect, passed by the gate circuit 10. Corresponding signals at the output of the gate circuit are applied to an indicator circuit 13. The indicator circuit 13 may include a pen recorder, cathode ray tube display device, and other visual and audible alarm circuits.

The gate 10 is closed by the same wheel passing over wheel-trip device 12, whereby no further signals attributable to the same journal box are applied to the indicator circuit 13.

As suggested in the drawing, the signal from the wheel trip 11 is applied over a lead to the gate 10 which may be of the type shown in Patent No. 2,963,575, of which I am a coinventor. Since the gate 10 passes signals from both channels, it may be understood that two similar gate circuits are utilized, as shown in this patent, one for each channel.

In accordance with the invention, the operation of the heat detecting circuit is automatically tested, checked or monitored so that at an unattended station, a faulty condition may be detected and an alarm signal transmitted to an attended station. The monitoring circuit is designed to operate on the signals produced by the detectors 6 and 7 and wheel-trip devices 11 and 12. The concurrence of signals is required because the detectors 6, 7 are normally closed to exposure and therefore produce no output. The detectors are opened automatically by the train passing over the first wheel-trip, e.g. 11, as suggested by a lead 14; for convenience, the wheel-trip means 11 can be referred to as a first electrical means producing first signals in response to the presence of a passing train, and one or both detectors 6, 7 can be referred to as a second electrical means producing second signals in response to heat radiations from journal boxes of passing rolling stock. It is during the period while the detectors are being exposed that the operation thereof is monitored, by what may be also referred to as a third electrical means for indicating the operability of the heat detector.

The monitoring circuit comprises two sections, a control section generally shown at 15 and an alarm section generally shown at 16.

The control section comprises a relay 17 having normally closed contacts 18, in the alarm section of the monitoring circuit; by "normally closed" I mean that, when relay 17 is not excited, the contacts 18 will be in closed condition, and when relay 17 is excited, contacts 18 are open, as shown. As long as the relay 17 is energized, the alarm circuit is held open, and no alarm signal is transmitted. A battery 19 is shown as a source of power supply for operating the alarm circuit. Energization, therefore, of relay 17 is an indication of normally functioning equipment, and deenergization of relay 17 produces an alarm signal which indicates faulty heat detecting equipment.

Two parallel relay means or circuits are utilized for maintaining the monitor relay 17 energized during normal operation.

The first relay means or circuit comprises an integrating relay 20 connected to the wheel-trip device 11, assuming the train to be moving in the direction of the arrow. The relay armature 21 normally makes contact with its back contact 22 (i.e., contact pair 21–22) in the absence of rolling stock passing over the wheel-trip device 11. Thus, in the absence of rolling stock, the winding of relay 17 is energized by battery 23, over armature 21 and contact 22 to ground. The wheel-trip device 11 produces a number of pulses corresponding in number to the number of wheels rolling thereover. These pulses are applied to the integrating relay 20, and for a preset time dependent upon the time constant of the relay, serve to energize the relay, thereby opening and holding open the contact 21; the time constant of relay 20 is preferably such as to hold the same continuously open as long as a train of minimum speed, say as low as five m.p.h., is passing the wheel-trip location.

An integrating relay is essentially a relay element and an input circuit comprising an integrator and a discharge means. The integrator functions exactly as a capacitor type of storage circuit. Signals applied to the capacitor are essentially integrated inasmuch as the charge stored on the capacitor is necessarily an integral function of the current passing therethrough. This charge will remain on the capacitor so long as there is no discharge path. However, almost simultaneously, with the application of pulses to the relay 20, signals from the heat detectors passed by the gate circuit 10 are applied to integrating relays 24 and 25 in the second relay means or circuit of the parallel energizing circuits. The relays 24 and 25, although of the integrating type, have pick-up time delays of shorter duration than the delay set into the relay 20, whereby they operate more rapidly than the relay 20. If the heat detecting equipment is operating normally, the windings of the integrating relays 24 and 25 will become energized and close their normally open contacts 26, 27 holding the same closed as long as heat signals of at least acceptable minimum amplitude are generated for normally and/or abnormally heated journals.

The output from wheel trip 11 is a series of signals which are rectified and integrated to produce a smoother and more continuous signal. This signal tends to decay during the discharge period (the time when the wheel trip is open) but the amplitude of the signal, because of the time constant of the discharge circuit, does not fall below the threshold level of the relay. Hence contact 21 is held open so long as the train is passing.

In like manner, the signals from detectors 6 and 7 after integration are smoothed to produce a more continuous signal. This signal tends to decay during the discharge period (the time when the wheel trip is open) but the amplitude of the signal, because of the time constant of the discharge circuit, does not fall below the threshold level of the relay. Hence contacts 26 and 27 are held closed so long as a train is passing. The relay 17 will thus be energized over the circuit comprising battery 28, contacts 27, 26 to ground.

In the drawing the circuits designated as integrating relays, e.g. 20, 24 and 25, are common relays energized by integrating circuits. For simplicity the combined structure and function of the integrating circuit and relay circuit is shown in a single box. Relays energized by integrating circuits are of course well known in the field as typified in the above mentioned copending applications. The integrating circuit also supplies a "hold-in" function which maintains the relay energized as long as the integrating circuit is charged to a predetermined level. The hold-in function permits the novel circuit to detect faulty conditions for trains moving at relatively slow speeds, for example, five miles per hour.

It is apparent that if either of the detectors 6 or 7 is defective, the associated integrating relay 24 or 25 will not operate, thereby deenergizing relay 17 and permitting the alarm circuit to close. In this event, the particular integrating relay 24 or 25 which fails to operate is seen to have been responsive to a heat-signal output (of less than adequate magnitude) to effect overriding deactuation of the alarm-control means or monitor relay 17.

Although wheel-trip devices have been illustrated, it is obvious that other apparatus, such as track relays, could be utilized satisfactorily.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. In combination,
a first electrical means comprising wheel trip means producing first signals in response to the presence of a passing train,
a second electrical means comprising a trackside mounted heat detector for producing second signals in response to heat radiations from journal boxes on moving rolling stock,
a third electrical means for indicating the operability of said heat detector comprising
a first control relay means having the winding thereof coupled to said first electrical means,
said first control relay means being switched in response to the output of said wheel trip means,
a second control relay means having the winding thereof coupled to said second electrical means, said second control relay means being switched in response to the output of said heat detector,
said first and second control relay means having first and second associated contact pairs respectively,
said third electrical means further including an alarm indicating means,
said alarm indicating means having an on and an off state,
means coupling said alarm indicating means to said first and second contact pairs,
one of said contact pairs being normally open and the other normally closed,
the state of said alarm indicating means being controlled by said contact pairs,
said alarm indicating means being off when said first control relay means is not switched,
said alarm indicating means being off when both of said control relay means are switched,
said alarm indicating means being on when said first control relay means is switched and said second control relay means is not switched,
said second relay means having a predetermined threshold level at which switching occurs,
said second relay means including integrating circuit means having associated discharge circuit means therein,
said discharge means having a preselected time constant controlling the discharge rate thereof,
said integrating circuit means storing said second signals respectively,
said stored signals controlling said second relay means,
said stored signals thereby being above said threshold level when said train is passing and as long as said second electrical means is producing output signals of at least minimum acceptable magnitude,
and said first control relay means including means retaining the same in switched state as long as wheel-trip signals of minimum recurrence rate are generated to indicate the presence of a moving train, whereby the operability of said heat detector is continually checked during the time the train is passing.

2. An electrical device for determining the operative condition of a hot-box detector system in which first electrical signals are developed in response to the presence of a train and second electrical signals are developed as output from heat detector elements of said detector system, said device comprising
first signal means responsive to said first electrical signals,
second signal means responsive to said second electrical signals,
alarm circuit means including an alarm indicator,
control means to control the condition of said alarm circuit,
means responsive to the output of said first signal means to actuate said control means,
said responsive means also being responsive to the output of said second signal means to effect overriding deactuation of said control means.

3. The device of claim 2 in which
said responsive means includes two pairs of contacts, one pair being normally open, the other pair being normally closed, said contact pairs being connected in parallel,
and two relays, one of said relays being responsive to said first signal means to open one of said contact pairs,
and the other of said relays being responsive to said second signal means to close the other of said contact means.

4. A system for detecting overheated journal boxes of railway cars, comprising
wayside infrared detecting means for sensing heat emitted from said journal boxes and giving an indication thereof,
testing means controlled by the output of said infrared detecting means for testing the operability of said infrared detecting means,
and indication means controlled by said testing means for giving an indication of the operability of said infrared detecting means.

5. A system for detecting overhead journal boxes of moving railway cars, comprising
wayside infrared detecting means for sensing heat emitted from the passing journal boxes of said cars and giving an indication of such heat,
checking means controlled by said infrared detecting means for checking the operability of said infrared detecting means,
and indication means controlled by said checking means for giving an indication of the operability of said infrared detecting means.

6. A system for detecting overheated journal boxes of moving railway cars, comprising
wayside infrared detecting means for sensing heat emitted from the passing journal boxes of said cars and giving an indication of such heat,
checking means controlled by said infrared detecting means for continually checking the operability of said infrared detecting means as long as said cars are passing said detecting means,
and indication means controlled by said checking means for giving an indication of the operability of said infrared detecting means.

7. The system of claim 6, in which said detecting means includes means producing signals in response to the presence of said passing railway cars,
and in which said checking means is also controlled by said car-presence signals.

8. In combination,
two trackside-mounted heat detectors on opposite sides of a length of track for producing electrical signals in response to heat radiations from journal boxes on moving rolling stock,
and an alarm circuit for indicating the operability of said heat detectors,
said combination comprising first and second control relays coupled respectively to the outputs of said detectors,
said control relays each having normally open contacts,
an alarm circuit relay, and circuit means including a power supply connected to the winding of said alarm circuit relay through a series connection of said normally open contacts,
whereby failure of either of said heat detectors activates said alarm circuit.

9. The combination according to claim 8, in which normally closed gating means is included in the connection of said heat detectors to said first and second control relays,
and wheel-operated trip means operatively connected to said gating means for opening said gating means substantially only when scanned journal boxes are in the fields of view of said detectors.

10. The combination according to claim 8, and including
train-presence detecting means producing an electrical signal when a train is passing said detectors,
said train-presence detecting means including normally closed relay means and being operative to open the contacts thereof when a train is passing said detectors,
the contacts of said normally closed relay means being connected to energize the winding of said alarm circuit relay,
whereby in the absence of a passing train said alarm circuit relay is operated,
said first and second control relays having faster pickup characteristics than said normally closed relay means,
whereby on detecting the presence of a train, and in the presence of at least a minimum satisfactory magnitude of heat-signal output of both said detectors, said normally open contacts will be actuated to closed position before the normally closed relay contacts are broken, thus maintaining said alarm circuit relay in safe operating condition while a train is passing and until an unsafe detector operating condition is sensed by one of said first and second control relays.

References Cited by the Examiner
UNITED STATES PATENTS

| Re. 24,983 | 5/1961 | Gallagher | 346—169 |
| 2,563,274 | 8/1951 | Rendel | 340—214 |
| 2,695,399 | 11/1954 | Martin | 340—214 |
| 2,719,912 | 10/1955 | Maenpaa | 246—182 |
| 2,763,853 | 9/1956 | Grant | 340—214 |
| 2,798,214 | 7/1957 | Rowell | 340—214 |
| 2,818,508 | 12/1957 | Johanson et al. | 246—169 |
| 2,963,575 | 12/1960 | Pelino et al. | 246—169 |
| 3,090,038 | 5/1963 | Klein et al. | 340—214 |

ARTHUR L. LA POINT, *Primary Examiner.*
LEO QUACKENBUSH, EUGENE G. BOTZ,
*Examiners.*